US006901786B2

(12) United States Patent
Hart

(10) Patent No.: US 6,901,786 B2
(45) Date of Patent: Jun. 7, 2005

(54) FUELING SYSTEM VAPOR RECOVERY AND CONTAINMENT LEAK DETECTION SYSTEM AND METHOD

(75) Inventor: Robert P. Hart, East Hampton, CT (US)

(73) Assignee: Veeder-Root Company, Simsbury, CT (US)

(*) Notice: Subject to any disclaimer, the term of this patent is extended or adjusted under 35 U.S.C. 154(b) by 0 days.

(21) Appl. No.: 10/645,370

(22) Filed: Aug. 21, 2003

(65) Prior Publication Data

US 2004/0069372 A1 Apr. 15, 2004

Related U.S. Application Data

(63) Continuation-in-part of application No. 09/725,727, filed on Nov. 30, 2000, now Pat. No. 6,622,757.

(60) Provisional application No. 60/168,029, filed on Nov. 30, 1999, provisional application No. 60/202,054, filed on May 5, 2000, and provisional application No. 60/202,659, filed on May 8, 2000.

(51) Int. Cl.[7] .......... G01M 3/08
(52) U.S. Cl. .......... 73/40.5 R
(58) Field of Search .......... 73/40.52, 40.5 R, 73/49.2, 49.3, 40; 340/605

(56) References Cited

U.S. PATENT DOCUMENTS

| | | | | |
|---|---|---|---|---|
| 3,016,928 | A | 1/1962 | Brandt | |
| 3,735,634 | A | 5/1973 | Clinton et al. | 73/64.2 |
| 4,147,096 | A | 4/1979 | Caswell | 98/122 |
| 4,166,485 | A | 9/1979 | Wokas | 141/52 |
| 4,215,565 | A | 8/1980 | Zanker | 73/30 |
| 4,508,127 | A | 4/1985 | Thurston | 137/8 |
| 4,543,819 | A | 10/1985 | Chin et al. | 73/64.2 |

(Continued)

OTHER PUBLICATIONS

"Vapor Recovery Test Procedure TP–201.5 Air to Liquid Volume Ratio," California Environmental Protection Agency Air Resources Board.

"Notice of Public Hearing to Consider Amendments to the Vapor Recovery Certification and Test Procedure Regulations for Enhanced Vapor Recovery," Title 17. California Air Resources Board.

"Hearing Notice and Staff Report Enhanced Vapor Recovery Initial Statement of Reasons for Proposed Amendments to the Vapor Recovery Certification and Test Procedures for Gasoline Loading and Motor Vehicle Gasoline Refueling at Service Stations," Feb. 4, 2000, California Environmental Protection Agency Air Resources Board.

"Gasoline Vapor Recovery Systems Test Methods Existing Procedures," California Air Resources Board.

"Vapor Recovery Certification and Test Procedure Regulations for Enhanced Vapor Recovery Documents," California Air Resources Board.

(Continued)

*Primary Examiner*—Hezron Williams
*Assistant Examiner*—John Fitzgerald
(74) *Attorney, Agent, or Firm*—Withrow & Terranova, PLLC

(57) ABSTRACT

A method and apparatus for monitoring a fuel vapor recovery system to determine if a leak condition exists in either the vapor return passage in a fuel dispenser or a common vapor return pipe. An air-flow sensor (AFS) may be located in the common vapor return pipe for all of the dispensing points at a service station, or in each fuel dispenser and coupled to the dispensing points of the fuel dispenser. The AFS registers vapor flow recovered by a dispensing point(s) that is returned back to the storage tank. If the AFS measures vapor flow when such dispensing point(s) coupled to such AFS is not actively recovering vapor, this is indicative of a leak in such dispensing point(s). The leak condition is reported by a tank monitor or other reporting system so that appropriate measures can be taken.

32 Claims, 5 Drawing Sheets

U.S. PATENT DOCUMENTS

| | | | | | |
|---|---|---|---|---|---|
| 4,566,504 | A | | 1/1986 | Furrow et al. | 141/59 |
| 4,570,686 | A | | 2/1986 | Devine | 141/286 |
| 4,611,729 | A | | 9/1986 | Gerstenmaier et al. | 222/75 |
| 4,653,334 | A | | 3/1987 | Capone | 73/863.81 |
| 4,687,033 | A | | 8/1987 | Furrow et al. | 141/59 |
| 4,749,009 | A | | 6/1988 | Faeth | 141/45 |
| 4,827,987 | A | | 5/1989 | Faeth | 141/59 |
| 4,842,027 | A | | 6/1989 | Faeth | 141/45 |
| 4,871,450 | A | | 10/1989 | Goodrich et al. | 210/151 |
| 4,938,251 | A | | 7/1990 | Furrow et al. | 137/269 |
| 4,967,809 | A | | 11/1990 | Faeth | 141/59 |
| 4,986,445 | A | | 1/1991 | Young et al. | 222/71 |
| 5,013,434 | A | | 5/1991 | Furrow | 210/232 |
| 5,027,499 | A | | 7/1991 | Prohaska | 29/595 |
| 5,038,838 | A | | 8/1991 | Bergamini et al. | 141/59 |
| 5,040,077 | A | | 8/1991 | Hamano | 358/407 |
| 5,040,576 | A | | 8/1991 | Faeth | 141/45 |
| 5,040,577 | A | | 8/1991 | Pope | 141/59 |
| 5,116,759 | A | | 5/1992 | Klainer et al. | 435/288 |
| 5,129,433 | A | | 7/1992 | Faeth | 141/45 |
| 5,143,258 | A | | 9/1992 | Mittermaier | 222/73 |
| 5,151,111 | A | | 9/1992 | Tees et al. | 55/164 |
| 5,156,199 | A | | 10/1992 | Hartsell, Jr. et al. | 141/83 |
| 5,165,379 | A | | 11/1992 | Thompson | 123/520 |
| 5,195,564 | A | | 3/1993 | Spalding | 141/1 |
| 5,203,384 | A | | 4/1993 | Hansen | 141/59 |
| 5,240,045 | A | | 8/1993 | Faeth | 141/1 |
| 5,244,022 | A | | 9/1993 | Gimby | 141/301 |
| 5,267,470 | A | | 12/1993 | Cook | 73/49.7 |
| 5,269,353 | A | | 12/1993 | Nanaji et al. | 141/59 |
| 5,280,814 | A | * | 1/1994 | Stroh | 141/83 |
| 5,295,391 | A | * | 3/1994 | Mastandrea et al. | 73/49.2 |
| 5,323,817 | A | | 6/1994 | Spalding | 141/1 |
| 5,332,008 | A | | 7/1994 | Todd et al. | 141/5 |
| 5,332,011 | A | | 7/1994 | Spalding | 141/59 |
| 5,333,654 | A | | 8/1994 | Faeth | 141/1 |
| 5,333,655 | A | | 8/1994 | Bergamini et al. | 141/59 |
| 5,355,915 | A | | 10/1994 | Payne | 141/83 |
| 5,365,985 | A | | 11/1994 | Todd et al. | 141/392 |
| 5,386,812 | A | | 2/1995 | Curran et al. | 123/520 |
| 5,417,256 | A | | 5/1995 | Hartsell, Jr. et al. | 141/7 |
| 5,450,883 | A | | 9/1995 | Payne et al. | 141/59 |
| 5,452,621 | A | | 9/1995 | Aylesworth et al. | 73/864.81 |
| 5,460,054 | A | | 10/1995 | Tran | 73/863.61 |
| 5,464,466 | A | | 11/1995 | Nanaji et al. | 95/45 |
| 5,500,369 | A | | 3/1996 | Kiplinger | 435/309.1 |
| 5,507,325 | A | | 4/1996 | Finlayson | 141/83 |
| RE35,238 | E | | 5/1996 | Pope | 141/59 |
| 5,542,458 | A | | 8/1996 | Payne et al. | 141/7 |
| 5,563,339 | A | | 10/1996 | Compton et al. | 73/64.45 |
| 5,563,341 | A | | 10/1996 | Fenner et al. | 73/335.11 |
| 5,568,828 | A | | 10/1996 | Harris | 141/348 |
| 5,571,310 | A | | 11/1996 | Nanaji | 96/4 |
| 5,590,697 | A | | 1/1997 | Benjay et al. | 141/59 |
| 5,592,979 | A | | 1/1997 | Payne et al. | 141/59 |
| 5,625,156 | A | | 4/1997 | Serrels et al. | 73/863.51 |
| 5,626,649 | A | | 5/1997 | Nanaji | 95/12 |
| 5,650,943 | A | * | 7/1997 | Powell et al. | 702/51 |
| 5,663,492 | A | | 9/1997 | Alapati et al. | 73/64.45 |
| 5,671,785 | A | | 9/1997 | Andersson | 141/59 |
| 5,720,325 | A | | 2/1998 | Grantham | 141/59 |
| 5,752,411 | A | | 5/1998 | Harpster | 73/861.04 |
| 5,755,854 | A | | 5/1998 | Nanaji | 95/11 |
| 5,780,245 | A | | 7/1998 | Maroteaux | 435/7.21 |
| 5,782,275 | A | | 7/1998 | Hartsell, Jr. et al. | 141/94 |
| 5,794,667 | A | | 8/1998 | Payne et al. | 141/128 |
| 5,803,136 | A | | 9/1998 | Hartsell, Jr. | 141/7 |
| 5,832,967 | A | | 11/1998 | Andersson | 141/59 |
| 5,843,212 | A | | 12/1998 | Nanaji | 96/4 |
| 5,850,857 | A | | 12/1998 | Simpson | 141/59 |
| 5,857,500 | A | | 1/1999 | Payne et al. | 141/59 |
| 5,860,457 | A | | 1/1999 | Andersson | 141/59 |
| 5,868,175 | A | | 2/1999 | Duff et al. | 141/59 |
| 5,878,790 | A | | 3/1999 | Janssen | 141/59 |
| 5,889,202 | A | | 3/1999 | Alapati et al. | 73/64.45 |
| 5,898,108 | A | | 4/1999 | Mieczkowski et al. | 73/118.1 |
| 5,911,248 | A | | 6/1999 | Keller | 141/59 |
| 5,913,343 | A | | 6/1999 | Andersson | 141/59 |
| 5,942,980 | A | | 8/1999 | Hoben et al. | 340/618 |
| 5,944,067 | A | | 8/1999 | Andersson | 141/59 |
| 5,956,259 | A | | 9/1999 | Hartsell, Jr. et al. | 364/528.37 |
| 5,985,002 | A | | 11/1999 | Grantham | |
| 5,988,232 | A | | 11/1999 | Koch et al. | 141/59 |
| 5,992,395 | A | | 11/1999 | Hartsell, Jr. et al. | 123/516 |
| 6,026,866 | A | | 2/2000 | Nanaji | 141/59 |
| 6,037,184 | A | | 3/2000 | Matilainen et al. | 436/177 |
| 6,038,922 | A | | 3/2000 | Mauze et al. | 73/335.08 |
| 6,047,745 | A | | 4/2000 | Fournier | 141/59 |
| 6,065,507 | A | | 5/2000 | Nanaji | 141/59 |
| 6,070,453 | A | | 6/2000 | Myers | 73/40.5 R |
| 6,082,415 | A | | 7/2000 | Rowland et al. | 141/59 |
| 6,102,085 | A | | 8/2000 | Nanaji | 141/83 |
| 6,103,532 | A | | 8/2000 | Koch et al. | 436/55 |
| 6,123,118 | A | | 9/2000 | Nanaji | 141/4 |
| 6,131,621 | A | | 10/2000 | Garrard | 141/59 |
| 6,151,955 | A | | 11/2000 | Ostrowski et al. | 73/40 |
| 6,167,747 | B1 | | 1/2001 | Koch et al. | 73/19.03 |
| 6,167,923 | B1 | | 1/2001 | Hartsell, Jr. | 141/192 |
| 6,169,938 | B1 | | 1/2001 | Hartsell, Jr. | 700/302 |
| 6,223,789 | B1 | | 5/2001 | Koch | 141/59 |
| 6,244,310 | B1 | | 6/2001 | Rowland et al. | 141/59 |
| 6,247,508 | B1 | | 6/2001 | Negley, III et al. | 141/94 |
| 6,302,165 | B1 | | 10/2001 | Nanaji et al. | 141/59 |
| 6,305,440 | B1 | | 10/2001 | McCall et al. | 141/7 |
| 6,325,112 | B1 | | 12/2001 | Nanaji | 141/4 |
| 6,336,479 | B1 | | 1/2002 | Nanaji | 141/4 |
| 6,338,369 | B1 | | 1/2002 | Shermer et al. | 141/83 |
| 6,347,649 | B1 | | 2/2002 | Pope et al. | 141/59 |
| 6,357,493 | B1 | | 3/2002 | Shermer et al. | 141/59 |
| D457,084 | S | | 5/2002 | Pope | D10/96 |
| 6,386,246 | B2 | | 5/2002 | Pope et al. | 141/59 |
| 6,418,981 | B1 | | 7/2002 | Nitecki et al. | 141/4 |
| 6,622,757 | B2 | | 9/2003 | Hart et al. | 141/7 |

OTHER PUBLICATIONS

"Vapor Recovery Test Procedure TP–201.3 Determination of 2 Inch WC Static Pressure Performance of Vapor Recovery Systems at Dispensing Facilities", California Environmental Protection Agency Air Resources Board.

"Final Statement of Reasons for Rulemaking, Including Summary of Comments and Agency Response Public Hearing to Consider the Adoption, Amendment and Repeal of Regulations Regarding Certification Procedures and Test Procedures for Gasoline Vapor Recovery Systems", California Environmental Protection Agency Air Resources Board, Public Hearing Dates: Mar. 23, 2000, Agenda Item No.: 00–3–2.

"ORVR Update Key Questions Remain on ORVR and Stage II Effectiveness of Refueling Vapor Recovery Still Up In The Air", Joe Totten, Petroleum Equipment & Technology Magazine, Apr. 1999.

"CARB Needs to Modify Plan for Improving Vapor Recovery Program", Wolf H. Koch, PhD, Petroleum Equipment & Technology Magazine, Aug. 1999.

"Unbalanced Treatment of Assist Vapor Recovery Systems", Wolf H. Koch, PhD, Petroleum Equipment & Technology Magazine, Nov. 1999.

"What Does Field Testing Show for Assist Vapor Recovery Systems?", Wolf H. Koch, PhD, & W. Dwain Simpson, PhD, Petroleum Equipment & Technology, Published: Oct. 1999.

"Membranes, Molecules and the Science of Permeation," Tedmund P. Tiberi, Petroleum Equipment & Technology, Published: Apr. 1999.

"Retooling the Vapor Recovery Systsm—Part 3: Reactions by Equipment Makers: Some Fugitive Emissions Remain at Large," Tedmund P. Tiberi, Petroleum Equipment & Technology, Published: Aug. 2000.

"Retooling the Vapor Recovery System—Part 3: Reactions by Equipment Makers: VST's membrane technology development," Glenn K. Walker, Petroleum Equipment & Technology, Published: Aug. 2000.

"Retooling the Vapor Recovery System—Part 3: Reactions by Equipment Makers: Hirt systems design changes," Robert D. Brandt, PhD, PE, Petroleum Equipment & Technology, Published Aug. 2000.

"DRAFT Performance Standards for In–Station Diagnostics (to be incorporated into CP–201)," California Air Resources Board, Revised Aug. 23, 1999.

"Part 2: Will New Rules Evade Old Concerns?", Wolf H. Koch, PhD, Petroleum Equipment & Technology Magazine, Published: Jul. 2000.

"Vapor Recovery Around the World," Tedmund P. Tiberi, Petroleum Equipment & Technology, Published: Sep. 2000.

"Vapor Recovery Certification Procedure CP–201 Certification Procedures for Vapor Recovery Systems at Gasoline Dispensing Facilities," California Environmental Protection Agency Air Resources Board.

* cited by examiner

FUELING SYSTEM VAPOR RECOVERY AND CONTAINMENT LEAK DETECTION SYSTEM AND METHOD

CROSS REFERENCE TO RELATED APPLICATIONS

This application is a continuation-in-part application of U.S. patent application Ser. No. 09/725,727, filed on Nov. 30, 2000 now U.S. Pat. No. 6,622,751, which is an application that relates to and claims priority to (1) U.S. Provisional Patent Application Ser. No. 60/168,029, filed on Nov. 30, 1999, entitled "Fueling System Vapor Recovery Performance Monitor;" (2) U.S. Provisional Patent Application Ser. No. 60/202,054, filed on May 5, 2000, entitled "Fueling System Vapor Recovery Performance Monitor;" and (3) U.S. Provisional Patent Application Ser. No. 60/202,659, filed on May 8, 2000, entitled "Method of Determining Failure of Fuel Vapor Recovery System."

FIELD OF THE INVENTION

The present invention relates to a fueling system vapor recovery and containment leak detection system.

BACKGROUND OF THE INVENTION

Gasoline dispensing facilities (i.e. gasoline stations) often suffer from a loss of fuel to the atmosphere due to inadequate vapor collection during fuel dispensing activities, excess liquid fuel evaporation in the fuel and vapor containment system storage tank (hereinafter referred to as "storage tank"), and inadequate reclamation of the vapors during tanker truck deliveries. Lost vapor is an air pollution problem that is monitored and regulated by both federal and state governments. Attempts to minimize losses to the atmosphere have been effected by various vapor recovery methods. Such methods include: "Stage-I vapor recovery" where vapors are returned from the vapor containment system to the delivery truck; "Stage-II vapor recovery" where vapors are returned from the refueled vehicle tank to the vapor containment system; vapor processing where the fuel/air vapor mix from the vapor containment system is received and the vapor is liquefied and returned as liquid fuel to the vapor containment system; burning excess vapor off and venting the less polluting combustion products to the atmosphere; and other fuel/air mix separation methods.

A "balance" Stage-II vapor recovery system may make use of a dispensing nozzle bellows seal to the vehicle tank filler pipe opening. This seal provides an enclosed space between the vehicle tank and the vapor recovery system. During fuel dispensing, the liquid fuel entering the vehicle tank creates a positive pressure which pushes out the ullage space vapors through the bellows sealed area into the nozzle vapor return port, through the dispensing nozzle and hose paths, and on into the storage tank.

It has been found that even with these measures, substantial amounts of hydrocarbon vapors are lost to the atmosphere, often due to poor equipment reliability and inadequate maintenance. This is especially true with Stage-II systems. One way to reduce this problem is to provide a vapor recovery system monitoring data acquisition and analysis system to provide notification when the system is not working as required. Such monitoring systems may be especially applicable to Stage-II systems.

When working properly, Stage-II vapor recovery results in substantially equal or designed exchanges of air or vapor (A) and liquid (L) between the storage tank and the consumer's gas tank. The notation "A" and the terms "air" and "vapor" are used loosely and interchangeably herein (and throughout) to refer to air and fuel vapor mix being returned from the refueled vehicle tank to the storage tank. Ideally, Stage-II vapor recovery produces an air-to-liquid (A/L) ratio very close to 1. In other words, returned vapor replaces an equal or substantially equal amount of liquid in the storage tank during refueling transactions. When the A/L ratio is close to 1, refueling vapors are collected, the ingress of fresh air into the vapor containment system is minimized and the accumulation of an excess of positive or negative pressure in the vapor containment system is prevented. This minimizes losses at the dispensing nozzle and fuel evaporation in the storage tank and leakage of excess vapors from the vapor containment system. Measurement of the A/L ratio thus provides an indication of proper Stage-II vapor collection operation. A low ratio means that vapor is not moving properly through the dispensing nozzle, hose, or other part of the system back to the storage tank, possibly due to an obstruction or defective component.

Recently, the California Air Resources Board (CARB) has been producing new requirements for Enhanced Vapor Recovery (EVR) equipment. These include stringent vapor recovery system monitoring and In-Station Diagnostics (ISD) requirements to continuously determine whether or not the systems are working properly. CARB has proposed that, when the A/L ratio drops below a prescribed limit for a single or some sequence of fueling transactions, an alarm be issued and the affected fueling point be disabled to allow repair to prevent further significant vapor losses. The proposed regulations also specify an elaborate and expensive monitoring system with many sensors that will be difficult to wire to a common data acquisition system.

The CARB proposal requires that A/L volume ratio sensors be installed at each dispensing hose or fuel dispensing point and pressure sensors be installed to measure the containment system vapor space pressure. The sensors would be wired to a common data acquisition system used for data logging, storage, and pass/fail analysis. It is likely that such sensors would comprise air-flow sensors (AFSs).

However, one issue that may occur in such a vapor recovery system employing AFS's is that a leak may occur in the vapor return passage or vapor return pipe where vapors are recovered and returned to the storage tank. If a leak occurs in the vapor return passage or vapor return pipe for a dispensing point, vapors are likely to escape outside of the vapor containment system to atmosphere thereby defeating the purpose of containing such vapors and returning them back to the underground storage tank. One method of detecting a possible leak in a vapor recovery system is to monitor the A/L ratio using an AFS for an active dispensing point to determine if the actual vapor being recovered is equal or substantially equal to the expected amount. However, this method does not always work.

For example, a defective air valve in the nozzle or vapor return pipe of a dispensing point may not close properly to block reverse vapor flow (i.e. out of the nozzle) when the dispensing point is idle. In such a case, the A/L ratio for the defective dispensing point will not be affected, because when the dispensing point is active, the vapor flow is normal and as expected.

Therefore, it may be desirable to include as part of a vapor recovery system employing AFS's the ability to detect leak conditions for dispensing points where determination of the A/L ratio for a dispensing point will not effectively detect such a leak.

SUMMARY OF THE INVENTION

The present invention relates to detection of a leak in a dispensing point, including the vapor return passage or a vapor return pipe coupled to the dispensing point, in a fuel dispenser vapor recovery system. An air-flow sensor (AFS), which may also be termed a "vapor flow sensor," is used to detect either vapor or air flowing in either the vapor return passage or the vapor return pipe of the vapor recovery system. The vapor return passage is the conduit for each individual dispensing point where recovered vapors are passed. All vapor return passages for each dispensing point are coupled into a common vapor return pipe coupled to the storage tank. In this manner, recovered vapors are captured and placed in the vapor return passage, which in turn transports the vapors to the vapor return pipe and on to the storage tank.

In general, if vapor is detected flowing at a dispensing point either in the direction of the nozzle to the storage tank, called "forward vapor flow," or in the direction of the storage tank to the nozzle, called "reverse vapor flow," this is an indication that a leak is present at such dispensing point. The AFS registers air from the leaking dispensing point as either the ingestion of air at the dispensing point or the egress of air out of the dispensing point depending on the pressure differential between the leak point in the dispensing point and the storage tank. The leak may be due to a defective air-valve in the nozzle, or a loose or defective fitting or coupling at the nozzle or in the hose and fuel conduit coupled to the nozzle, that does not properly close when the dispensing point is idle, or the leak may be due to a leak in the hose connected to the nozzle or anywhere in the vapor return passage between the nozzle and the AFS.

In one embodiment of the present invention, the AFS is placed in each vapor return passage coupled to one or more dispensing points in a fuel dispenser. In this manner, the AFS registers vapor flow recovered by each individual dispensing point. If the AFS registers vapor flow when such one or more dispensing points are idle, a leak is present at a dispensing point coupled to the AFS. If the vapor or air flow detected by the AFS is "forward vapor flow," this is indicative of outside air being ingressed into the leak point of the dispensing point. If the vapor flow detected by the AFS is "reverse vapor flow," this is indicative of vapor from the storage tank being egressed out of the leak point of the dispensing point.

In a second embodiment of the present invention, an AFS is placed in the common vapor return pipe that is coupled to one or more vapor return passages of the individual dispensing points. In this manner, the AFS registers vapor flow for each of the vapor return passages coupled to the vapor return pipe and where such vapor flow passes through the AFS before reaching the storage tank. If the AFS registers vapor flow when all of the dispensing points are idle, then a leak is present at one or more of the dispensing points. If the vapor or air flow detected by the AFS is "forward vapor flow," this is indicative of outside air being ingressed into the leak point of the dispensing point. If the vapor flow detected by the AFS is "reverse vapor flow," this is indicative of vapor from the storage tank being egressed out of the leak point of the dispensing point.

A combined data acquisition system/in-station diagnostic monitor receives the AFS readings in the aforementioned embodiments and detects the leak condition at the dispensing point. The monitor may generate an alarm and may report the condition to a point-of-sale (POS) system and/or a remote reporting system. The monitor and/or the POS may shut down one or more dispensing points if configured to do so when a leak condition is detected.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The invention will be described in conjunction with the following drawings in which like reference numerals designate like elements and wherein.

DETAILED DESCRIPTION OF THE INVENTION

This application is a continuation-in-part application of U.S. patent application Ser. No. 09/725,727, filed on Nov. 30, 2000 and incorporated herein by reference in its entirety, which is an application that relates to and claims priority to (1) U.S. Provisional Patent Application Ser. No. 60/168,029, filed on Nov. 30, 1999 entitled "Fueling System Vapor Recovery Performance Monitor" incorporated herein by reference in its entirety; (2) U.S. Provisional Patent Application Ser. No. 60/202,054, filed on May 5, 2000, entitled "Fueling System Vapor Recovery Performance Monitor" incorporated herein by reference in its entirety; and (3) U.S. Provisional Patent Application Ser. No. 60/202,659, filed on May 8, 2000, entitled "Method of Determining Failure of Fuel Vapor Recovery System" incorporated herein by reference in its entirety.

The present invention relates to detection of a leak at a dispensing point in in a fuel dispenser vapor recovery system. An air-flow sensor (AFS), which may also be termed a "vapor flow sensor," is used to detect vapor or air flowing in either the vapor return passage or the vapor return pipe of the vapor recovery system. The vapor return passage is the conduit for each individual dispensing point for a fuel dispenser where recovered vapors are passed. All vapor return passages for each dispensing point are coupled into a common vapor return pipe coupled to the storage tank. In this manner, recovered vapors are captured and placed in the vapor return passage, which in turn transports the vapors to the vapor return pipe and on to the storage tank. The terms "vapor" and "air" are used interchangeably in this application and its claims, and use of one term is also used to represent the other term.

In general, if vapor is detected flowing at an idle dispensing point in the direction of the nozzle to the storage tank, called "forward vapor flow," and the dispensing point is not "active" (i.e. idle), this is an indication that a leak exists at a dispensing point coupled to the AFS. If vapor or air flow is detected flowing at an idle dispensing point in the direction of the nozzle to the storage tank, called "forward vapor flow," and the dispensing point is not "active," this is an indication that outside air is being ingressed into the leaking dispensing point. If vapor is detected flowing at a dispensing point in the direction of the storage tank to the nozzle, called "reverse vapor flow," and the dispensing point is not "active," this is an indication that vapor from the storage tank is being egressed out of the leaking dispensing point to atmosphere. These aspects of the invention will be further discussed in this application.

Figure 1:
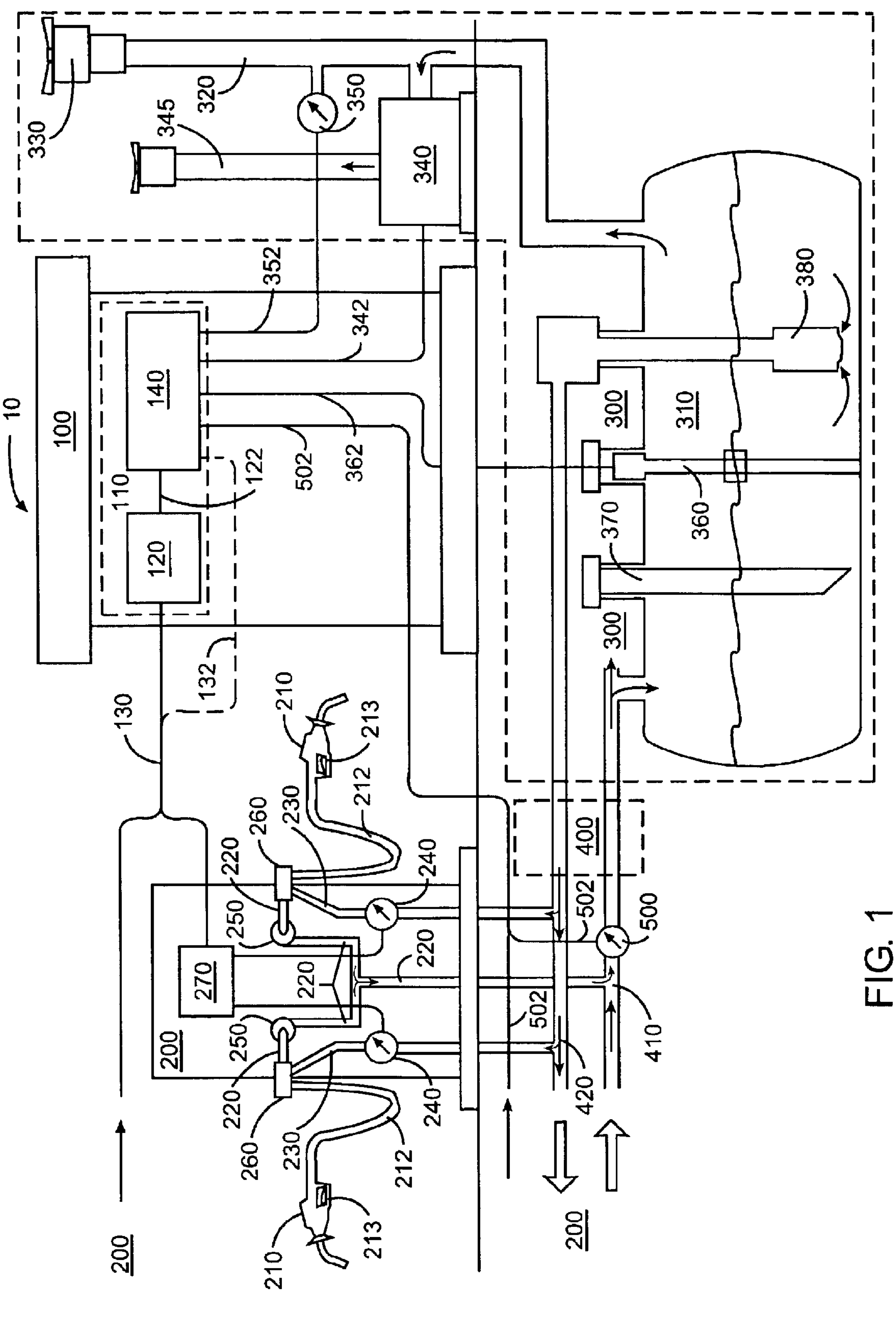
FIG. 1 is a schematic view of a fueling system vapor recovery performance monitor in accordance with an embodiment of the present invention.

Before further discussing the details of the leak detection system of the present invention, which are described below and operationally illustrated in FIGS. 4 and 5, one embodiment of the vapor recovery and containment monitoring system for use in a liquid fuel dispensing facility of the present invention is described first in FIG. 1. As illustrated in FIG. 1, a dispensing facility 10 is provided that may include a station house 100, one or more fuel dispenser units 200, a main fuel storage system 300, means for connecting the dispenser units 200 to the main fuel storage system 400, and one or more of the air (or vapor) flow sensors (AFS's) 500.

The station house 100 may include a central electronic control and diagnostic arrangement 110 that includes a dispenser controller 120, dispenser current loop interface wiring 130 connecting the dispenser controller 120 with the dispenser unit(s) 200, and a combined data acquisition system/in-station diagnostic monitor 140. The dispenser controller 120 may be electrically connected to the monitor 140 by a first wiring bus 122. The interface wiring 130 may be electrically connected to the monitor 140 by a second wiring bus 132. The monitor 140 may include standard computer storage and central processing capabilities, keyboard input device(s), and audio and visual output interfaces among other conventional features.

The fuel dispenser units 200 may be provided in the form of conventional "gas pumps." Each fuel dispenser unit 200 may include one or more dispensing points typically defined by the nozzles 210, also called dispensing points 210. The fuel dispenser units 200 may include one coaxial vapor/liquid splitter 260, one vapor return passage 220, and one fuel supply passage 230 per nozzle 210. The nozzle 210 or vapor return passage 220 may contain an air-valve 213 that opens when fuel is being dispensed so that the vapor return passage 220 is not open to atmosphere when a dispensing point 210 is not active and recovering vapor. An examples of an air-valve 213 that may be used in the present invention is disclosed in U.S. Pat. No. 5,195,564, which is incorporated herein by reference in its entirety.

The vapor return passages 220 may be joined together before connecting with a common vapor return pipe 410. The units 200 may also include one liquid fuel dispensing meter 240 per nozzle 210. The liquid fuel dispensing meters 240 may provide dispensed liquid fuel amount information to the dispenser controller 120 via the liquid fuel dispensing meter interface 270 and interface wiring 130.

The main fuel storage system 300 may include one or more storage tanks 310. It is appreciated that the storage tanks 310 may typically be provided underground, however, underground placement of the tank is not required for application of the invention. An underground or aboveground fuel storage tank is commonly referred to as a "UST" or "AST", respectively. It is also appreciated that the storage tank 310 shown in FIGS. 1 and 2 may represent a grouping of multiple storage tanks tied together into a storage tank network.

Each storage tank 310, or a grouping of storage tanks, hereinafter referred to as "storage tank 310", may be connected to the atmosphere by a vent pipe 320. The vent pipe 320 may terminate in a pressure relief valve 330. A vapor processor 340 may be connected to the vent pipe 320 intermediate of the storage tank 310 and the pressure relief valve 330. A pressure sensor 350 may also be operatively connected to the vent pipe 320. Alternately, it may be connected directly to the storage tank 310 or the vapor return pipe 410 below or near to the dispenser 200 since the pressure is normally substantially the same at all these points in the vapor containment system.

The storage tank 310 may also include an Automatic Tank Gauging System (ATGS) 360 used to provide information regarding the fuel level in the storage tank 310. The vapor processor 340, the pressure sensor 350, and the automatic tank gauging system 360 may be electrically connected to the monitor 140 by third, fourth, and fifth wiring busses 342, 352, and 362, respectively. The storage tank 310 may also include a fill pipe and fill tube 370 to provide a means to fill the tank with fuel and a submersible pump 380 to supply the dispensers 200 with fuel from the storage tank 310.

The means for connecting the dispenser units 200 and the main fuel storage system 400 may include one or more vapor return pipelines 410 and one or more fuel supply pipelines 420. The vapor return pipelines 410 and the fuel supply pipelines 420 are connected to the vapor return passages 220 and fuel supply passages 230, respectively, associated with multiple dispensing points 210. As such, a "vapor return pipeline" 410 designates any return pipeline that carries the return vapor of two or more vapor return passages 220.

In this embodiment, the AFS 500 is operatively connected to a common vapor return pipeline 410. Thus, the AFS 500 must be operatively connected to the vapor return system downstream of the vapor return passages 220 for each of the fuel dispensers 200. Each AFS 500 may be electrically connected to the monitor 140 by a sixth wiring bus 502.

In order to determine the acceptability of the performance of vapor recovery in the facility 10, the ratio of vapor flow to dispensed liquid fuel is determined for each fuel dispensing point 210 included in the facility 10. This ratio may be used to determine if the fuel dispensing point 210 in question is in fact recovering an equal volume of vapor for each unit volume of liquid fuel dispensed by the dispensing point 210.

In FIG. 1, each dispensing point 210 is served by an AFS 500 that is shared with at least one other dispensing point 210. Mathematical data processing may be used to determine an approximation of the vapor flow associated with each dispensing point 210, as is described in the parent application of the present invention, U.S. patent application Ser. No. 09/725,727, filed on Nov. 30, 2000, entitled "Fueling System Vapor Recovery and Containment Performance Monitor and Method of Operation Thereof," incorporated herein by reference in its entirety.

The amount of fuel dispensed by each dispensing point 210 is known from the liquid fuel dispensing meter 240 associated with each dispenser unit 200. Amount of fuel (i.e. fuel volume) information may be transmitted from each dispensing meter 240 to the dispenser controller 120 for use by the monitor 140. In an alternative embodiment of the invention, the dispensing meters 240 may be directly connected to the monitor 140 to provide the amount of fuel information used to determine the A/L ratio for each dispensing point 210.

The AFS 500 measures multiple (at least two or more) dispensing point 210 return vapor flows. In the embodiment of the invention shown in FIG. 1, a single AFS 500 measures all the dispensing point 210 vapor flows for the facility 10. In the case of a single AFS 500 per facility 10, the AFS 500 is installed in the single common vapor return pipeline 410 which runs between all the dispensers 200 as a group, which are all tied together into a common dispenser manifold pipe, and all the storage tanks 310 as a group, which are all tied together in a common tank manifold pipe. Various groupings of combinations of feed dispensing point 210 air flows per AFS 500 are possible which fall between these two extremes described.

Figure 2:
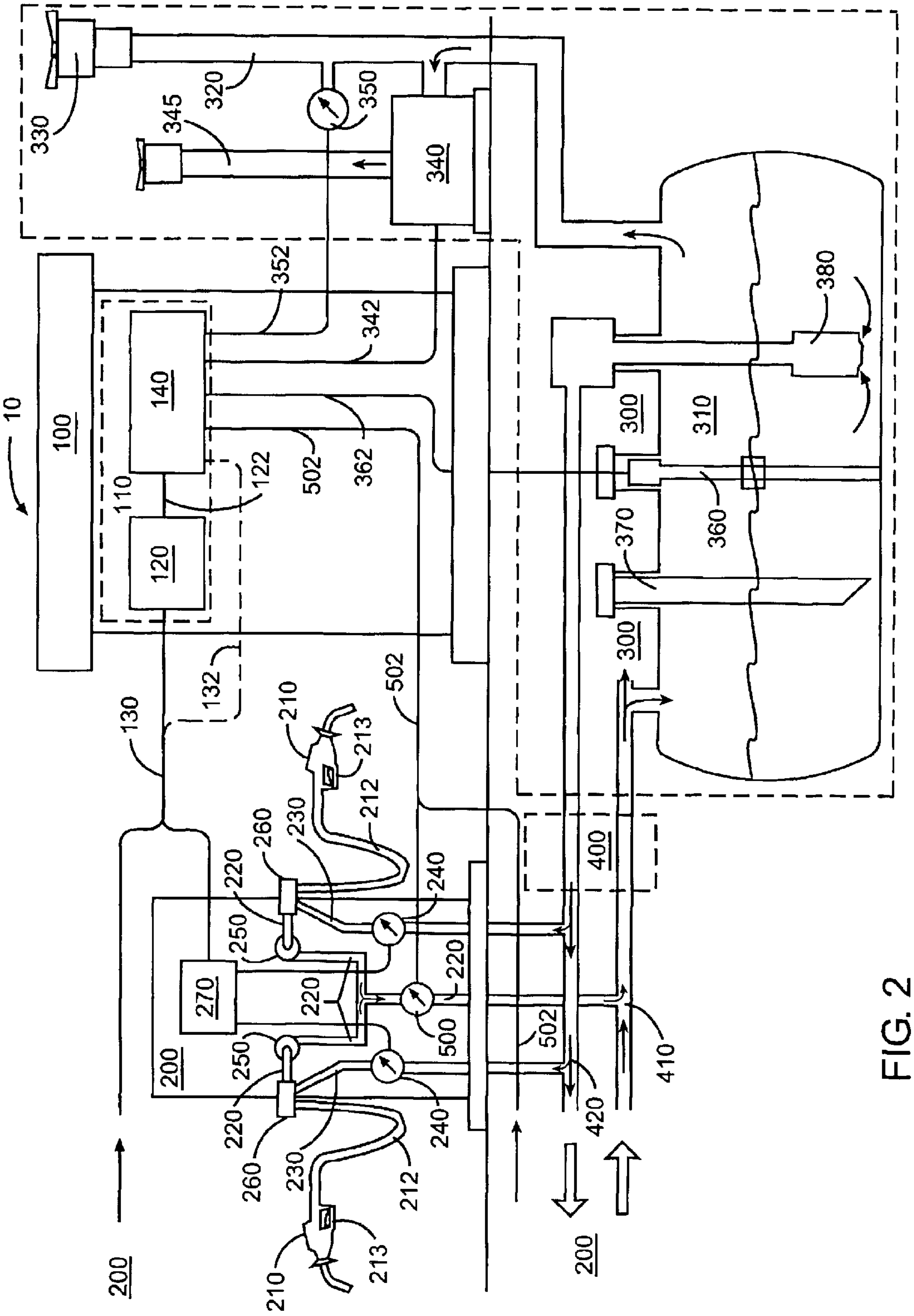
FIG. 2 is a schematic view of a fueling system vapor recovery performance monitor in accordance with another embodiment of the present invention.

FIG. 2 illustrates a second embodiment of the vapor recovery and containment monitoring system for use in a liquid fuel dispensing facility 10 according to the present invention. In FIG. 2, multiple AFS's 500 are illustrated as deployed to measure various groupings of dispensing point 210 vapor flows, down to a minimum of only two dispensing point 210 vapor flows. One AFS 500 is installed in each dispenser housing 200, which typically contains two dispensing points 210 (one dispensing point per dispenser side) or up to 6 dispensing points 210 (hoses) in Multi-Product Dispensers (MPDs) (3 dispensing points 210 per side of the dispenser 200). The vapor flows piped through the vapor return passage 220 may be tied together to feed the single AFS 500 in the dispenser housing 200.

As stated above, the monitor 140 may connect to the dispenser controller 120, directly to the current loop interface wiring 130 or directly to the liquid fuel dispensing meter 240 to access the liquid fuel flow volume readings. The monitor 140 may also be connected to each AFS 500 at the facility 10 so as to be supplied with vapor flow amount (i.e. vapor volume) information. The liquid fuel flow volume readings are individualized fuel volume amounts associated with each dispensing point 210. The vapor flow volume readings are aggregate amounts resulting from various groupings of dispensing point 210 vapor flows, which therefore require mathematical analysis to separate or identify the amounts attributable to the individual dispensing points 210. This analysis may be accomplished by the monitor 140 and may include processing means.

Once the vapor flow information is determined for each dispensing point 210, the A/L ratios for each dispensing point 210 may be determined and a pass/fail determination may be made for each dispensing point based on the magnitude of the ratio. It is known that the ratio may vary from 0 (bad) to around 1 (good), to a little greater than 1 (which, depending upon the facility 10 design, can be either good or bad), to much greater than 1 (typically bad). This ratio information may be provided to the facility operator via an audio signal and/or a visual signal through the monitor 140. The ratio information may also result in the automatic shut down of a dispensing point 210, or a recommendation for dispensing point 210 shut down.

The embodiments of the invention shown in FIGS. 1 and 2 may provide a significant improvement over known systems due to the replacement of the multiple AFSs 500 (one per dispensing point, typically anywhere from 10 or 12 up to 30 or more per site) and their associated wiring with a single, or fewer AFSs 500 (about 2 as many or less, depending upon dispensing point groupings).

Figure 3:
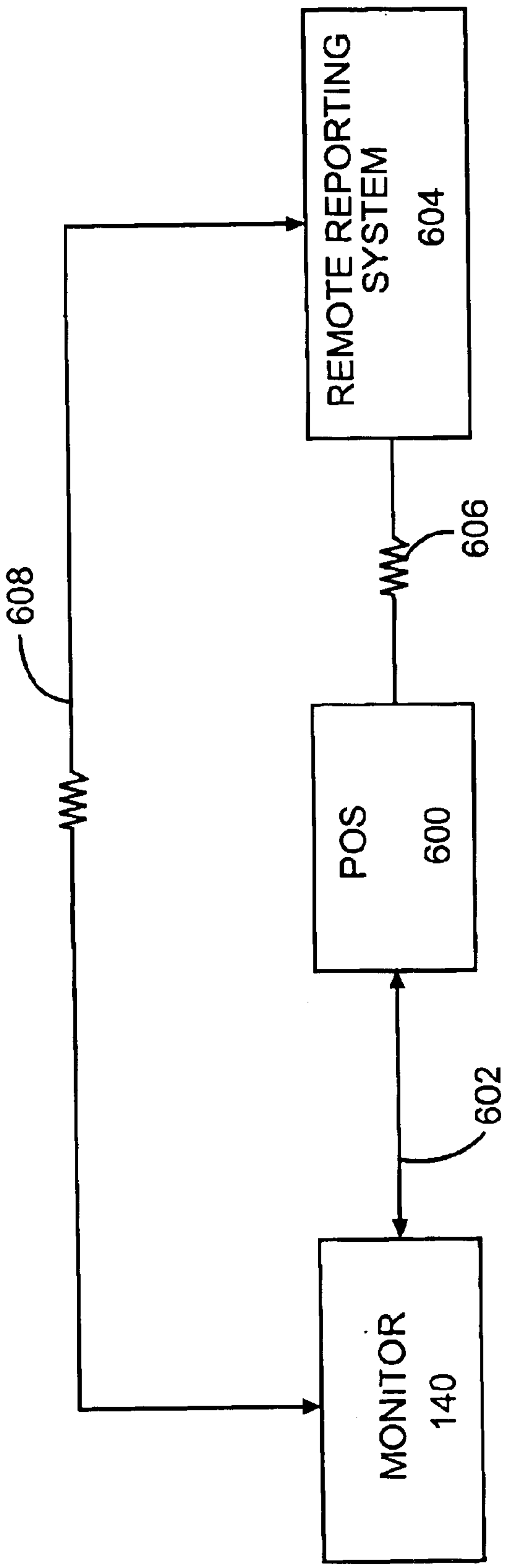
FIG. 3 is a schematic view of a communication architecture between the monitor, the POS controller and a remote reporting system.

FIG. 3 illustrates a possible communication architecture that is used to report information and alarms by the monitor 140 to another system. For example, the monitor 140 may be communicatively coupled to a point-of-sale (POS) 600 using a communication line 602. The communication line 602 may be any type of communication line, including but not limited to a current loop, LAN, or Ethernet. In this manner, the monitor 140 can report information and other alarms, including information received from AFSs 500, to the POS 600. The monitor 140 can also retrieve metering data relating to the fuel dispensers 200 from the POS 600 since the monitor 140 uses this information for fuel storage system 300 calibration as is described in U.S. Pat. Nos. 4,977,528; 5,544,518; and 5,665,895, which are incorporated herein by reference in their entireties. The POS 600 can in turn communicate such information to a remote reporting system 604 over a communication line 606, which may be a physical line or wireless or satellite communication. Alternatively, the monitor 140 may communicate directly to the remote reporting system 604 using its own dedicated communication line 608. Again, communication lines 606, 608 may be any type including but not limited to a current loop, LAN, and Ethernet. The remote reporting system 604 may be located anywhere including off site from the fueling facility 10. It is desired to detect any leaks that occur in the vapor return passage 220 at any of the dispensing points 210 so that such leaks can be reported and repaired as soon as possible. The leak at a dispensing point 210 may be present anywhere between the nozzle 210 and an AFS 500, including the vapor return passage 220 and the vapor return pipeline 410. In FIG. 1, the AFS 500 registers any vapor flow that occurs as a result of any of the dispensing points 210 recovering vapor. For instance, in FIG. 1, the AFS 500 is placed in the common vapor return pipe 410 in between the vapor return passages 220 of the dispensing points 210 and the storage tank 310. In this manner, any vapor that is recovered by any of the dispensing points 210 enters into the vapor return pipe 410 and passes through the AFS 500 for registering vapor flow before such vapors reach the storage tank 310. If the AFS 500 registers vapor flow when all of the dispensing points 210 coupled to the AFS 500 are idle, meaning not actively recovering vapor, this is indicative of a leak somewhere in one or more of the dispensing points 210 coupled to the AFS 500. This is because vapor flow should not be registered by the AFS 500 when the dispensing points 210 coupled to the AFS 500 are idle. The leak may be anywhere in the dispensing point 210 between the nozzle 210 and the AFS 500.

Either "forward vapor flow" or "reverse vapor flow," as previously described above, will occur at the AFS 500 if a dispensing point 210 coupled to the AFS 500 contains a leak, and there is a pressure differential between the storage tank 310 and the dispensing point 210. If the storage tank 310 is under a lower pressure than a dispensing point 210 containing a leak, outside air will be ingressed through the leak in the dispensing point 210 thereby causing the AFS 500 to register "forward vapor flow." If the dispensing point 210 containing a leak is under a lower pressure than the storage tank 310, vapor from the storage tank 310 will egress out of the leak at the dispensing point 210 thereby causing the AFS 500 to register "reverse vapor flow."

By way of additional examples, if the pressure in the vapor return pipe 410 is negative, excess air from the outside may be drawn into or ingressed into the vapor return pipe 410 and possibly returned to the storage tank 310 thereby causing the pressure inside the storage tank 310 to rise. In this instance, the AFS 500 will register "forward vapor flow," as previously described above. If an air-valve 213 in a dispensing point 210 is defective by remaining open when the dispensing point 210 is idle and the pressure in the storage tank 310 is higher than the pressure at the dispensing point 210, vapor from the storage tank 310 may egress through the defective air-valve 213 to atmosphere. In this instance, the AFS 500 will register "reverse vapor flow," as previously described above. Note that a defective dispensing point 210 may also be a leak caused by a loose or defective fitting or coupling at the nozzle, in the hose and fuel conduit coupled to the nozzle, or anywhere between the nozzle 210 and the AFS 500, which will also cause vapor from the storage tank 310 to egress through the defective dispensing point 210. The term defective dispensing point 210 encompasses all of the aforementioned types of leaks at a dispensing point 210.

Figure 4:
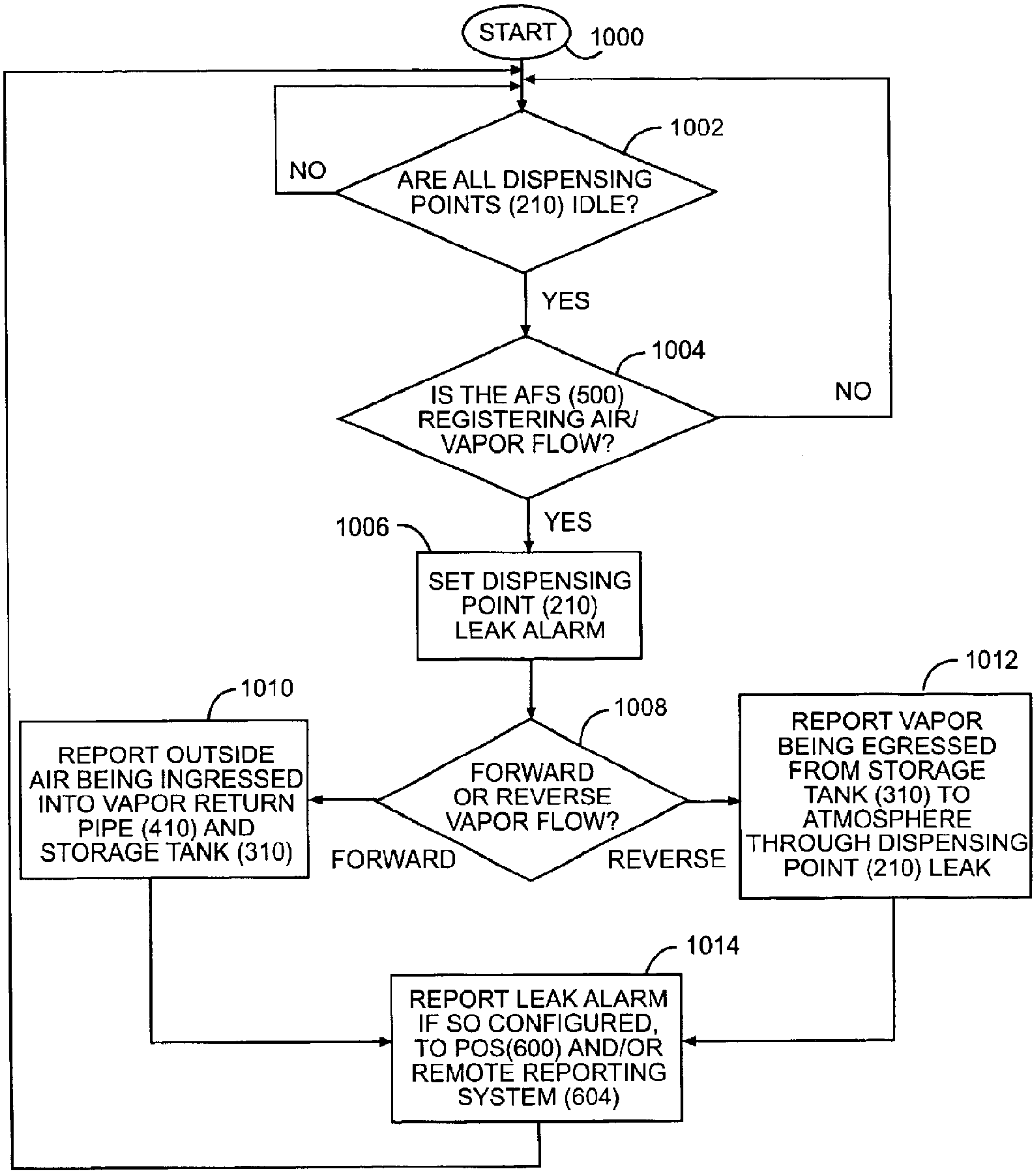
FIG. 4 is a flowchart diagram of one embodiment of a leak detection system that may be performed in accordance with the embodiment illustrated in FIG. 1 of the present invention.

The flowchart in FIG. 4 illustrates the embodiment performed by the monitor 140 illustrated in FIG. 1 wherein one AFS (500) is located in the vapor return pipe 410 for all dispensing points 210, but such processing could also be performed by any control system that is capable of communicating with the AFS 500 to determine vapor flow as well as having knowledge of the state, idle or active, of the dispensing points 210. As illustrated in FIG. 4, the process starts (block 1000), and the monitor 140 determines if all dispensing points 210 coupled to an AFS 500 are idle (decision 1002). If not, the process goes back to decision 1002 again in a repeating fashion. If all of the dispensing points 210 coupled to an AFS 500 are idle (decision 1002), the monitor 140 determines if the AFS 500 is or has registered vapor flow (decision 1004). If not, this means that no leak indication is present since no vapor flow is occurring at an idle dispensing point 210, and the process goes back to decision 1002 to continue repeating the process.

If the monitor 140 determines that vapor or air flow is or has been registered by the AFS 500 (decision 1004), the monitor 140 sets a leak alarm for the dispensing points 210 that are coupled to the AFS 500 (block 1006). This is because a registered vapor or air flow by the AFS 500 when all dispensing points 210 coupled to such AFS 500 are idle is indicative of a leak. The monitor 140 may also be configured, in response to detection of a leak at a dispensing point 210, to cause such dispensing point 210 where a leak is detected to shut down or remain idle until the leak detection condition can be further analyzed and/or repaired.

Next, the monitor 140 determines if the vapor flow is flowing in the forward or reverse direction via vapor or air flow direction information received from the AFS 500 (decision 1008). If the AFS 500 detects "forward vapor flow," the monitor 140 additionally reports a "forward vapor flow" as being indicative that outside air is being ingested through the leak in the dispensing point 210 and being returned to the vapor return pipe 410 and storage tank 310 (block 1010). "Forward vapor flow" is caused by the pressure at the dispensing point 210 being at a higher pressure level than the pressure level in the vapor return pipe 410 and the storage tank 310. If the AFS 500 detects a "reverse vapor flow," the monitor 140 reports a "reverse vapor flow" as being indicative that vapor from the storage tank 310 is being egressed to the environment though the leak in a dispensing point 210 coupled to the AFS 500 (block 1012). "Reverse vapor flow" is caused by the pressure at the dispensing point 210 being at a lower pressure level than the pressure level in the vapor return pipe 410 and/or the storage tank 310.

Note that the monitor 140 may be configured to indicate a leak at a dispensing point 210 based on either no vapor or air flow registration by the AFS 500 or more than a threshold amount of vapor flow being registered by the AFS 500 depending on sensitivity of the AFS 500. For instance if, according to testing, a leak at a dispensing point 210 is certain to always register a vapor or air flow by the AFS 500 of a certain threshold amount due to certain inherent inaccuracies in either the AFS 500 or the system, the monitor 140 may be configured in decision 1004 to not indicate a registration of vapor or air flow by the AFS 500 for leak detection purposes unless vapor or air flow is above such threshold amount even if vapor or air flow is greater than a zero amount. Configuring the monitor 140 to register a leak at a dispensing point 210 only if vapor or air flow detected by the AFS 50 is greater than a threshold flow amount may be important if the AFS 500 is capable of registering some flow due to sensitivity or pressure variations in the system when no leak is present at a dispensing point 210. Such may be necessary to reduce and/or eliminate false leak detections.

After the tank monitor reports the leak condition at a dispensing point 210, whether it be due to "forward vapor flow" or "reverse vapor flow" detection by the AFS 500 (blocks 1010 and 1012, respectively), the monitor 140 may also communicate such leak alarm to the POS 600 and/or the remote reporting system 604 (block 1014). The monitor 140, the POS 600 and/or the remote reporting system 604 may cause the dispensing points 210 where a leak may be present to shut down or remain idle until the leak detection condition can be further analyzed and/or repaired. The monitor 140 then repeats the leak detection process (block 1000).

In FIG. 2 as previously discussed, the AFS 500 is located in the vapor return passage 220 inside the fuel dispenser unit 200 in between the nozzle 210 and the vapor return passage 220 instead of in the common vapor return pipe 410, as illustrated in FIG. 1. In this manner, any vapor or air flow that is recovered by the particular dispensing point 210 where a particular AFS 500 for such dispensing point 210 is provided will pass through such AFS 500 for registering vapor flow. If a leak occurs in the vapor return passage 220 in a particular fuel dispenser unit 200 employing an AFS 500 and such dispensing point 210 is idle, vapor flow will be registered by the AFS 500. This is indicative of a leak in a dispensing point 210 coupled to the AFS 500 that registered vapor or air flow since vapor or air flow should not be registered by the AFS 500 when the dispensing points 210 coupled to the AFS 500 are idle.

Either "forward vapor flow" or "reverse vapor flow," as previously described above, will occur at the AFS 500 if a dispensing point 210 coupled to the AFS 500 contains a leak, and there is a pressure differential between the storage tank 310 and the dispensing point 210. In the embodiment illustrated in FIG. 2, since the AFS 500 is located in the vapor return passage 220 instead of the vapor return pipe 410, the pressure differential that will cause registered flow at the AFS 500 is between the vapor return pipe 410 and the dispensing point 210. The pressure level in the vapor return pipe 410 and the storage tank 310 should be substantially the same during normal operation.

By way of example, if the pressure in the vapor return passage 220 is negative, excess air from the outside may be drawn into or ingressed into the vapor return passage 220 and possibly returned to the storage tank 310, via the vapor return pipe 410, thereby causing the pressure inside the storage tank 310. In this instance, the AFS 500 will register "forward vapor flow," as previously described above. If an air-valve 213 in a dispensing point 210 is defective by remaining open when the dispensing point 210 is idle and the pressure inside the storage tank 310 is higher than the pressure at the dispensing point 210, vapor recovered in the vapor return pipe 410 from another active dispensing point 210 may egress through the defective air-valve 213 to atmosphere instead of returning to the storage tank 310 or vapor from the storage tank 310 may egress through the defective air-valve 213 to atmosphere. In this instance, the AFS 500 will register "reverse vapor flow," as previously described above.

Figure 5:
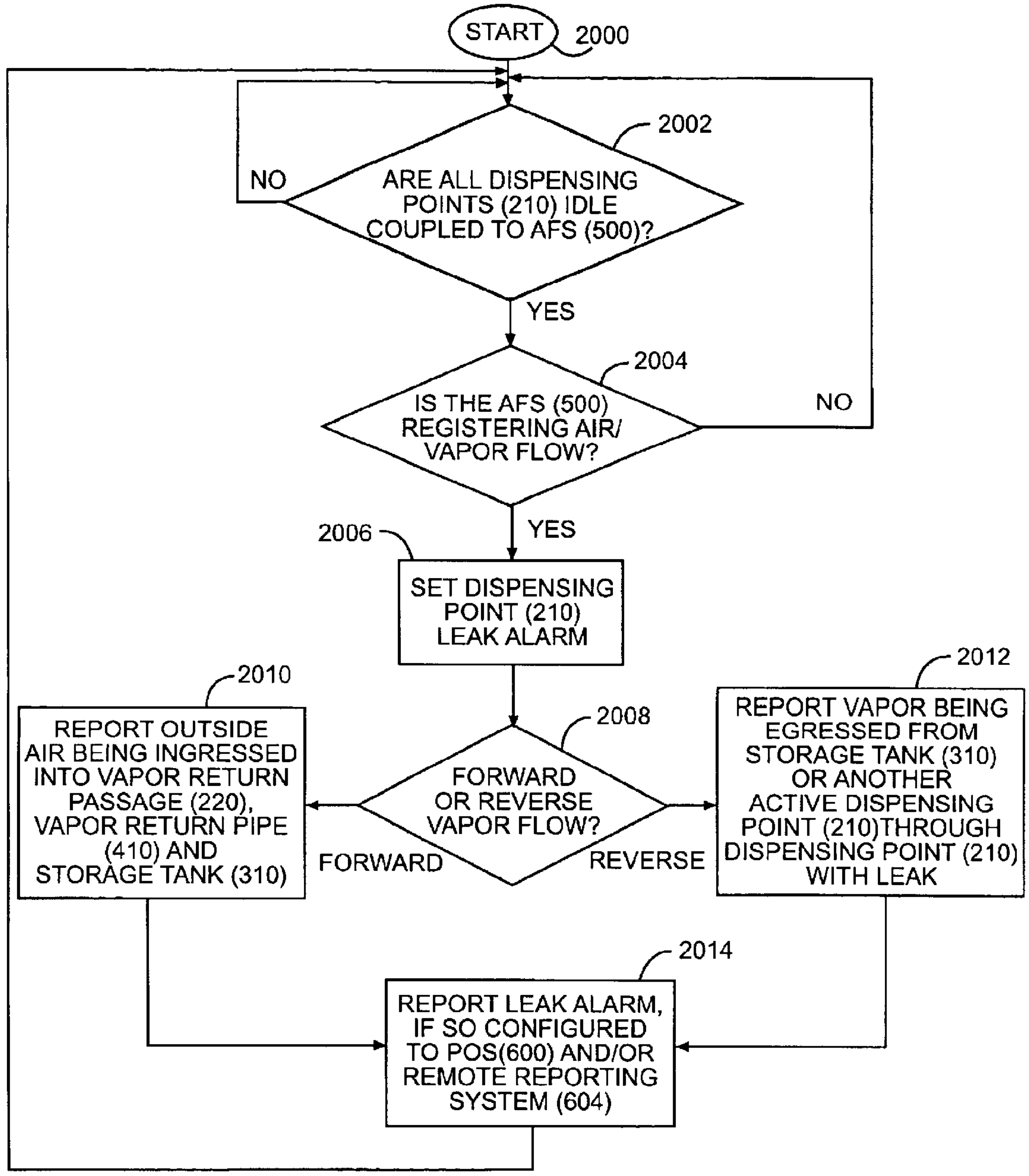
FIG. 5 is a flowchart diagram of another embodiment of a leak detection system that may be performed in accordance with the embodiment illustrated in FIG. 2 of the present invention.

The flowchart in FIG. 5 illustrates one embodiment of the vapor return pipe 410 leak detection system of the present invention where an AFS 500 is placed in the vapor return passage 220 in a fuel dispenser unit 200 like that illustrated in FIG. 2. In this manner, a registered vapor flow by the AFS 500 when the dispensing point 210 is idle is indicative of a leak somewhere in the vapor return passage 220 between the nozzle 210 and the AFS 500. The flowchart in FIG. 5 illustrates processing performed by the monitor 140, but such processing could also be performed by any control system that is capable of communicating with the AFS 500 to determine vapor flow as well as having knowledge of the state, idle or active, of a dispensing point 210 employing an AFS 500.

As illustrated in FIG. 5, the process starts (block 2000), and the monitor 140 determines if all of the dispensing points 210 coupled to a particular AFS 500 are idle (decision 2002). If not, the process goes back to decision 2002 again checking to determine if all of the dispensing points 210 coupled to an AFS 500 are idle (decision 2002). Note that the flowchart process illustrated in FIG. 5 may be used to detect a leak for any number of groups of dispensing points 210 that are coupled to an AFS 500 individually since the embodiment in FIG. 2 may include more than one AFS 500 each for the dispensing points 210 in a fuel dispenser 200.

If all of the dispensing points 210 are idle (decision 2002), the monitor 140 determines if the AFS 500 for such dispensing points 210 is or has registered vapor or air flow (decision 2004). If not, this means that no leak indication is present since no vapor or air flow is occurring, and the process goes back to decision 2002 to repeat the process.

Once the monitor 140 determines that vapor or air flow is or has been registered by the AFS 500 indicating a leak in a particular group of dispensing points 210 (decision 2004), the monitor 140 sets a dispensing point 210 leak alarm since a leak is occurring in one or more of the dispensing points 210 coupled to the AFS 500 that registered vapor or air flow (block 2006). This is because a registered vapor flow by the AFS 500 when all dispensing points 210 coupled to such AFS 500 are idle is indicative of a leak in the dispensing point 210 and/or the vapor return passage 220 on the nozzle 210 side of the AFS 500. The monitor 140 may also be configured, in response to detection of a leak at a dispensing point 210, to cause such dispensing point 210 where a leak is detected to shut down or remain idle until the leak detection condition can be further analyzed and/or repaired.

Next, the monitor 140 determines if the vapor flow is flowing in the forward or reverse direction via vapor flow direction information received from the AFS 500 (decision 2008). If the AFS 500 detected "forward vapor flow," the monitor 140 additionally reports a "forward vapor flow" as being indicative that outside air is being ingressed through the leak in the dispensing point 210 and being placed the vapor return passage 220, the vapor return pipe 410, and the storage tank 310 (block 2010). "Forward vapor flow" is caused by the pressure at the dispensing point 210 being at a higher pressure level than the pressure level in the vapor return passage 220, the vapor return pipe 410 and/or storage tank 310. If the AFS 500 detected a "reverse vapor flow," the monitor 140 reports a "reverse vapor flow" as being indicative that vapor from the storage tank 310 is being egressed to the environment though the leak in a dispensing point 210 coupled to the AFS 500 (block 2012). "Reverse vapor flow" is caused by the pressure at the dispensing point 210 being at a lower pressure level than the pressure level in the vapor return passage 220, the vapor return pipe 410, and/or storage tank 310.

Note that the monitor 140 may be configured to indicate a leak at a dispensing point 210 based on either no vapor flow registration by the AFS 500 or more than a threshold amount of vapor flow being registered by the AFS 500 depending on sensitivity of the AFS 500. For instance if, according to testing, a leak at a dispensing point 210 is certain to always register a vapor or air flow by the AFS 500 of a certain threshold amount due to certain inherent inaccuracies in either the AFS 500 or the system, the monitor 140 may be configured in decision 2004 to not indicate a registration of vapor or air flow by the AFS 500 for leak detection purposes unless vapor or air flow is above such threshold amount even if vapor or air flow is greater than a zero amount. Configuring the monitor 140 to register a leak at a dispensing point 210 only if vapor or air flow detected by the AFS 500 is greater than a threshold flow amount may be important if the AFS 500 is capable of registering some flow due to sensitivity or pressure variations in the system when no leak is present at a dispensing point 210. Such may be necessary to reduce and/or eliminate false leak detections.

After the tank monitor reports the leak condition at a dispensing point 210, whether it be due to "forward vapor flow" or "reverse vapor flow" detection by the AFS 500 (blocks 2010 and 2012, respectively), the monitor 140 may also communicate such leak alarm to the POS 600 and/or the remote reporting system 604 (block 2014). The monitor 140, the POS 600 and/or the remote reporting system 604 may cause the dispensing points 210 where a leak may be present to shut down or remain idle until the leak detection condition can be further analyzed and/or repaired. The monitor 140 then repeats the leak detection process (block 2000).

Those skilled in the art will recognize improvements and modifications to the preferred embodiments of the present invention. The embodiments described above are for illustration and enabling purposes, and the techniques and methods applied are equally applicable to any volatile liquid storage system. The words "air" and "vapor" may be used interchangeably in this application. All such improvements and modifications are considered within the scope of the concepts disclosed herein and the claims that follow.

We claim:

1. A leak detection system for a fuel dispensing vapor recovery system that recovers vapors during refueling of a vehicle and returns the vapors to a storage tank, comprising:

at least one fuel dispensing point that delivers fuel from the storage tank to the vehicle and returns recovered vapors expelled from the vehicle into a vapor return passage that is coupled to a vapor return pipe arid wherein said vapor return pipe is coupled to the storage tank;

an air-flow sensor operatively connected to said vapor return passage to measure the amount of vapor or air flow being returned to said vapor return passage and said vapor return pipe from said at least one fuel dispensing point; and a control system that is electronically coupled to said air-flow sensor to receive information about vapor or air flow detected by said air-flow sensors, wherein said control system without actively recovering vapor or air:

determines if said at least one fuel dispensing point is idle, and if said at least one fuel dispensing point is idle:

determines if said air-flow sensor registers vapor air-flow; and detects a leak condition in said at least one fuel dispensing point if said air-flow sensor registers vapor or air flow.

2. The system of claim 1, wherein said control system reports said leak detection.

3. The system of claim 2, wherein said control system generates an alarm to report said leak detection.

4. The system of claim 2, wherein said control system reports said leak detection to a remote reporting system.

5. The system of claim 1, wherein said control system is comprised from the group consisting of a tank monitor and a POS.

6. The system of claim 1, wherein said control system detects if said vapor or air flow is in the forward or reverse direction.

7. The system of claim 1, wherein said leak detection is due to a defective fuel dispensing point in said at least one fuel dispensing point.

8. The system of claim 7, wherein said defective fuel dispensing point is a defective air-valve,

9. The system of claim 8, wherein said air-valve is located in a nozzle of said at least one fuel dispensing point.

10. The system of claim 1, wherein said control system is a monitor, and said monitor is coupled to a POS to determine when said at least one fuel dispensing point is idle.

11. A method of detecting a leak in a fuel dispensing vapor recovery system that recovers vapors during refueling of a vehicle and returns the vapors to a storage tank, comprising the steps of:

delivering fuel from the storage tank to the vehicle through at least one fuel dispensing point;

returning vapors received by said at least one fuel dispensing point that are expelled from the vehicle into a vapor return passage;

returning said recovered vapors from said vapor return passage into a vapor return pipe coupled to the storage tank;

measuring the amount of vapor or air flow being returned back to the storage tank from said at least one fuel dispensing point using an air-flow sensor; and without actively recovering vapor or air:

determining if said at least one fuel dispensing point is idle, and if said at least one fuel dispensing point is idle:

determining if said air-flow sensor registers vapor or air flow; and detecting a leak condition in said at least one fuel dispensing point if said air-flow sensor registers vapor or air flow.

12. The method of claim 11, further comprising the step of reporting said leak detection in said vapor return passage if vapor or air flow is detected when said at least one fuel dispensing point is idle in said determining step.

13. The method of claim 12, wherein said step of reporting further comprises generating an alarm to report said leak detection.

14. The method of claim 12, further comprising the step of reporting said leak detection to a remote reporting system.

15. The method of claim 11, further comprising the step of determining if said vapor or air flow is in the forward or reverse direction.

16. The method of claim 11, further comprising the step of communicating with a POS to determine when said at least one fuel dispensing point is idle.

17. A leak detection system for a fuel dispensing vapor recovery system that recovers vapors during refueling of a vehicle and returns the vapors to a storage tank, comprising:

a plurality of fuel dispensing points that deliver fuel from the storage tank to the vehicle and capture recovered vapors into a vapor return passage dedicated to each of said plurality of fuel dispensing points, wherein said vapor return passages are coupled to a common vapor return pipe that is coupled to the storage tank;

an air-flow sensor operatively connected to said vapor return pipe to measure the amount of vapor or air flow being returned back to the storage tank from said plurality of fuel dispensing points; and a control system that is electronically coupled to said air-flow sensor to receive information about vapor or air flow detected by said air-flow sensor, wherein said control system without actively recovering vapor or air:

determines if all of said plurality of fuel dispensing points are idle, and if all of said plurality of fuel dispensing points are idle:

determines if said air-flow sensor registers vapor or air flow; and detects a leak condition in either said vapor return passage or said vapor return pipe if said air-flow sensor registers vapor or air flow.

18. The system of claim 17, wherein said control system reports said leak detection.

19. The system of claim 18, wherein said control system generates an alarm to report said leak detection.

20. The system of claim 18, wherein said control system reports said leak detection to a remote reporting system.

21. The system of claim 17, wherein said control system is comprised from the group consisting of a tank monitor and a POS.

22. The system of claim 17, wherein said control system detects if said vapor or air flow is in the forward or reverse direction.

23. The system of claim 17, wherein said leak detection in said vapor return passage or said vapor return pipe is due to a defective fuel dispensing point in one of said plurality of fuel dispensing points.

24. The system of claim 23, wherein said defective fuel dispensing point is due to a defective air valve coupled to said defective fuel dispensing point.

25. The system of claim 24, wherein said air valve is located in a nozzle in one of said plurality of fuel dispensing points.

26. The system of claim 17, wherein said control system is a monitor, and said monitor is coupled to a POS to determine when said plurality of fuel dispensing points are idle.

27. A method of detecting a leak in a fuel dispensing vapor recovery system that recovers vapors during refueling of a vehicle and returns the vapors to a storage tanks, comprising the steps of:

delivering fuel from the storage tank to a plurality of fuel dispensing points;

recovering vapor expelled from the vehicle at said plurality of fuel dispensing points and returning said vapor into a vapor return passage dedicated to each of said plurality of fuel dispensing points;

returning vapors recovered in said vapor return passages to a common vapor return pipe that is coupled to the storage tank;

measuring the amount of vapor or air flow being returned back to the storage tank from said vapor return pipe using an air-flow sensor; and without actively recovering air vapor or air:

determining if all of said plurality of fuel dispensing points are idle, and if all of said plurality of fuel dispensing points are idle:

determining if said air-flow sensor registers vapor or air flow; and detecting a leak condition in said plurality of fuel dispensing points if said air-flow sensor registers vapor or air flow.

28. The method of claim 27, further comprising the step of reporting said leak detection if vapor or air flow is detected when said plurality of fuel dispensing points are idle in said determining step.

29. The method of claim 28, wherein said step of reporting further comprises generating an alarm to report said leak detection.

30. The method of claim 28, further comprising the step of reporting said leak detection to a remote reporting system.

31. The method of claim 27, further comprising the step of determining if said vapor or air flow is in the forward or reverse direction.

32. The method of claim 27, further comprising the step of communicating with a POS to determine when said plurality of fuel dispensing points are idle.

* * * * *